(12) United States Patent
Yamauchi et al.

(10) Patent No.: US 7,985,351 B2
(45) Date of Patent: Jul. 26, 2011

(54) LIQUID-CRYSTAL POLYESTER RESIN COMPOSITION

(75) Inventors: Hiroyasu Yamauchi, Tsukuba (JP); Mitsuo Maeda, Tsukuba (JP); Fuminori Satoji, Yokkaichi (JP); Kenji Ito, Nagoya (JP)

(73) Assignees: Sumitomo Chemical Co., Ltd., Tokyo (JP); NTN Corporation, Osaka (JP)

( * ) Notice: Subject to any disclaimer, the term of this patent is extended or adjusted under 35 U.S.C. 154(b) by 535 days.

(21) Appl. No.: 11/573,055

(22) PCT Filed: Aug. 2, 2005

(86) PCT No.: PCT/JP2005/014108
§ 371 (c)(1),
(2), (4) Date: Feb. 1, 2007

(87) PCT Pub. No.: WO2006/013852
PCT Pub. Date: Feb. 9, 2006

(65) Prior Publication Data
US 2007/0219301 A1    Sep. 20, 2007

(30) Foreign Application Priority Data
Aug. 3, 2004   (JP) .................................. 2004-226444

(51) Int. Cl.
*C09K 19/00* (2006.01)
(52) U.S. Cl. .............. 252/299.01; 252/500; 252/519.12; 528/271; 528/272; 524/405; 524/495; 524/496; 524/497; 524/599; 524/601; 524/605

(58) Field of Classification Search ............. 252/299.01, 252/299.6, 506, 519.12; 528/271, 272; 524/405, 524/497, 496, 495, 599, 601, 602, 605
See application file for complete search history.

(56) References Cited

U.S. PATENT DOCUMENTS

| 3,637,595 A | 1/1972 | Cottis et al. |
| 4,772,422 A * | 9/1988 | Hijikata et al. ................ 252/511 |
| 5,158,701 A | 10/1992 | Asai et al. |
| 5,518,781 A | 5/1996 | Nakamura et al. |
| 6,153,121 A | 11/2000 | Makabe et al. |
| 6,177,500 B1 * | 1/2001 | Okamoto et al. .............. 524/442 |
| 2003/0001139 A1 * | 1/2003 | Nagano et al. ............ 252/299.67 |

FOREIGN PATENT DOCUMENTS

| CN | 1194293 A | 9/1988 |
| JP | 47-47870 B1 | 12/1972 |
| JP | 62-131067 A | 6/1987 |
| JP | 3-59067 A | 3/1991 |
| JP | 5-230342 A | 9/1993 |
| JP | 6-194988 | 7/1994 |
| JP | 2830124 B2 | 9/1998 |
| JP | 11-080517 | 3/1999 |
| JP | 11-293096 | 10/1999 |

* cited by examiner

*Primary Examiner* — James Seidleck
*Assistant Examiner* — Frances Tischler
(74) *Attorney, Agent, or Firm* — Sughrue Mion, PLLC

(57) ABSTRACT

A liquid crystalline polyester resin composition comprising 100 parts by weight of a liquid crystalline polyester; 50 to 150 parts by weight of at least one whisker selected from aluminum borate whisker and titanium oxide whisker; and 1 to 30 parts by weight of carbon black having a specific surface area of at least 200 $m^2/g$. This liquid crystalline polyester resin composition has excellent mechanical properties and provides an insulator which is hardly charged.

6 Claims, No Drawings

LIQUID-CRYSTAL POLYESTER RESIN COMPOSITION

FIELD OF THE INVENTION

The present invention relates to a liquid crystalline polyester resin composition, in particular, a liquid crystalline polyester resin composition containing a certain whisker and a specific carbon black.

DESCRIPTION OF PRIOR ART

Liquid crystalline polyesters are widely used in the electric and electronic fields since they have various excellent properties required in those fields. For example, JP-A-5-230342 teaches that a liquid crystalline polyester resin composition containing 5 to 35 parts by weight of aluminum borate whiskers per 100 parts by weight of a liquid crystalline polyester has good mechanical properties, and JP-A-62-131067 discloses a liquid crystalline polyester resin composition comprising 5 to 43 parts by weight of carbon black per 100 parts by weight of a liquid crystalline polyester.

However, the liquid crystalline polyester resin composition disclosed in JP-A-5-230342 has a problem that it is easily charged and thus it has adverse influences on electronic precision circuits using such a liquid crystalline resin composition. The liquid crystalline polyester resin composition disclosed in JP-A-62-131067 does not cause any problem due to charging as described above since it contains carbon black, but it cannot be used in applications in which electric conductivity is undesirable such as parts of electronic precision circuits except circuits. In addition, this liquid crystalline polyester resin composition has low mechanical properties.

As the result of an research conducted by the present inventors, it was found that the simple change of a content of carbon black based on the weight of a liquid crystalline polyester cannot provide any insulator that is hardly charged, since the electric conductivity of the resin composition drastically changes.

SUMMARY OF THE INVENTION

An object of the present invention is to provide a liquid crystalline polyester resin composition which has good mechanical properties and can be used as an insulator which is hardly charged.

Accordingly, the present invention provides a liquid crystalline polyester resin composition comprising:

100 parts by weight of a liquid crystalline polyester;

50 to 150 parts by weight of at least one whisker selected from aluminum borate whisker and titanium oxide whisker; and 1 to 30 parts by weight of carbon black having a specific surface area of at least 200 m²/g.

The liquid crystalline polyester resin composition of the present invention has good mechanical properties and a volume resistivity of 104 to 107 ohm·m.

DETAILED DESCRIPTION OF THE INVENTION

Firstly, the liquid crystalline polyester used in the present invention is explained.

The liquid crystalline polyester resin used in the composition of the present invention is a thermotropic liquid crystalline polyester which forms an optically anisotropic melt at a temperature of 450° C. or lower.

Examples of such a liquid crystalline polyester include:

(1) a polyester obtained by polymerizing an aromatic hydroxycarboxylic acid, an aromatic dicarboxylic acid and an aromatic diol;

(2) a polyester obtained by polymerizing different aromatic hydroxycarboxylic acids;

(3) a polyester obtained by polymerizing an aromatic dicarboxylic acid and an aromatic diol;

(4) a polyester obtained by reacting an aromatic hydroxycarboxylic acid with a crystalline polyester such as polyethylene terephthalate, etc.

The liquid crystalline polyester used in the composition of the present invention may be prepared by using an ester-forming derivative of such an aromatic hydroxycarboxylic acid, an aromatic dicarboxylic acid or an aromatic diol in place of such a compound.

Examples of the ester-forming derivative of the carboxylic acid include highly reactive derivatives which accelerate the polyester-forming reaction, for example, acid chlorides and acid anhydrides; esters with alcohols or glycols which form polyesters by transesterification.

Examples of the ester-forming derivative of the compound having a phenolic hydroxyl group include esters of compounds having a phenolic hydroxyl group with carboxylic acids which form polyesters by transesterification.

The aromatic hydroxycarboxylic acid, aromatic dicarboxylic acid and aromatic diol may be substituted with one or more substituents such as a halogen atom (e.g. a chlorine atom, a fluorine atom, etc.), an alkyl group (e.g. a methyl group, an ethyl group, etc.), an aryl group (e.g. a phenyl group, etc.), and so on, as long as the effects of the present invention are not impaired.

Non-limited examples of the repeating units of the liquid crystalline polyester include the following repeating units.

(A) Repeating units derived from aromatic hydroxycarboxylic acids:

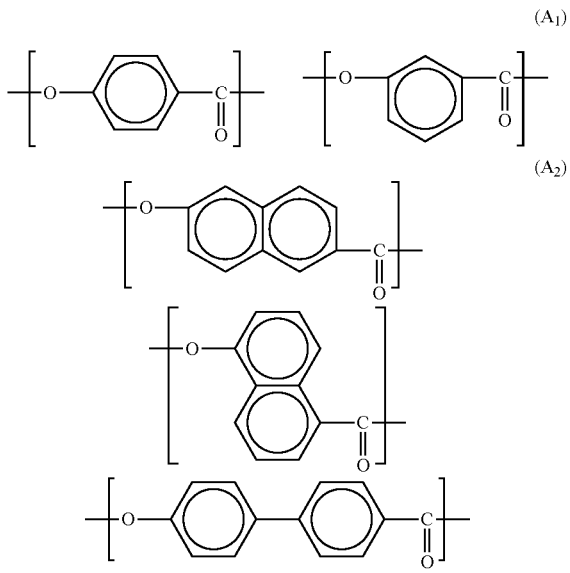

Each of the above repeating units may be substituted with a halogen atom, an alkyl group or an aryl group.

(B) Repeating units derived from an aromatic dicarboxylic acid:

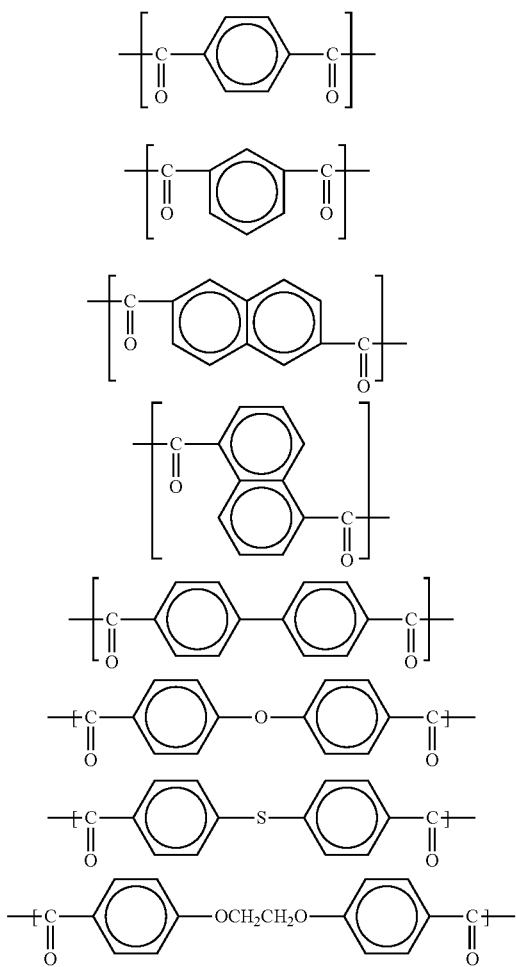

Each of the above repeating units may be substituted with a halogen atom, an alkyl group or an aryl group.

(C) Repeating units derived from an aromatic diol:

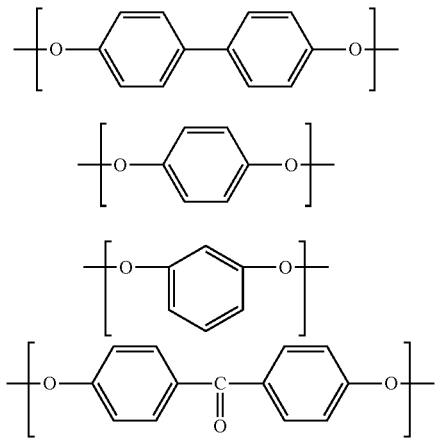

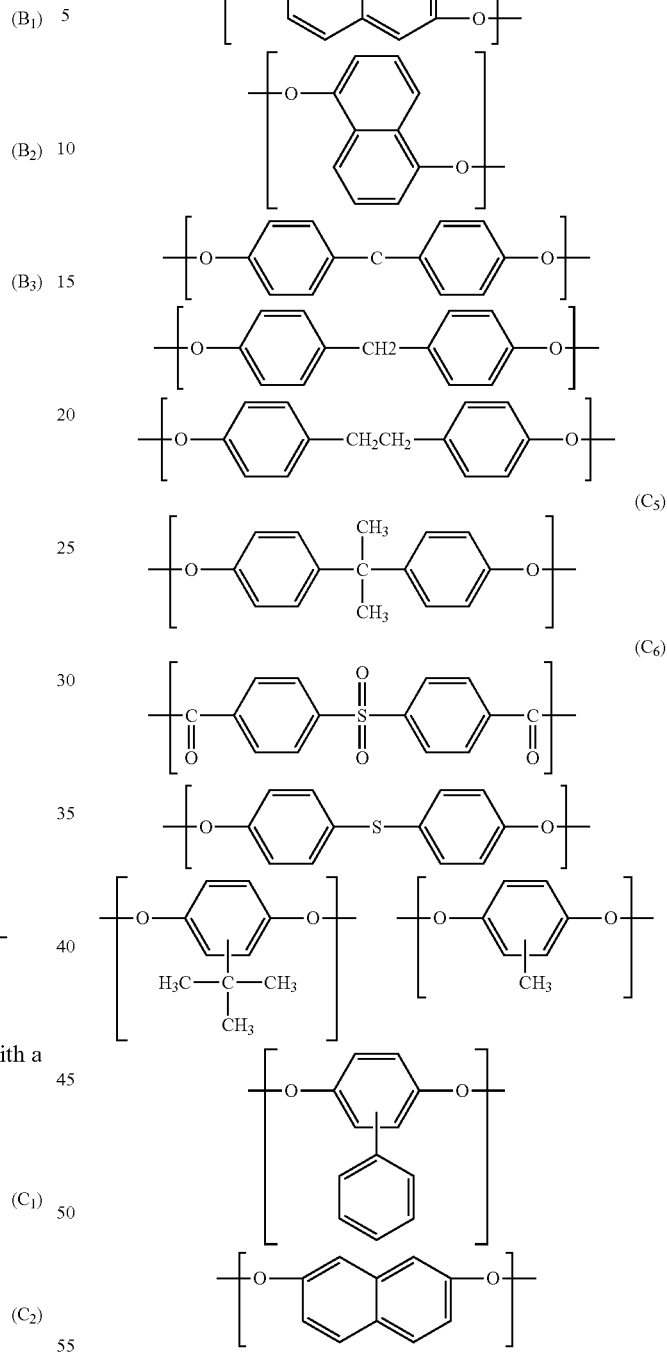

Each of the above repeating units may be substituted with a halogen atom, an alkyl group or an aryl group.

The liquid crystalline polyester used in the composition of the present invention may comprise a combination of at least one repeating unit selected from each of Groups (A), (B) and (C). In particular, the following combinations (i) to (vi) of the repeating units are preferable:

(i) Combination of the repeating units $(A_1)$, $(B_1)$ and $(C_1)$, or combination of the repeating units $(A_1)$, $(B_1)$, $(B_2)$ and $(C_1)$;

(ii) Combination of the repeating units $(A_1)$ and $(A_2)$;

(iii) Combination (i) in which at least a part of the repeating units ($A_1$) are replaced by the repeating units ($A_2$);

(iv) Combination (i) in which at least apart of the repeating units ($B_1$) are replaced by the repeating units ($B_3$);

(v) Combination (i) in which at least apart of the repeating units ($C_1$) are replaced by the repeating units ($C_3$);

(vi) Combination of the repeating units ($A_1$), ($A_2$), ($B_1$) and ($C_1$).

The properties of the liquid crystalline polyester resins comprising the above combinations (i), (ii), etc. of the repeating units are described in, for example, JP-B-47-47870 and JP-B-63-3888.

From the viewpoint of the balance of heat resistance and mechanical properties, the liquid crystalline polyester resin preferably comprises at least 30% by mole of the repeating units ($A_1$).

More preferably, the liquid crystalline polyester resin comprises the repeating units ($A_1$), ($B_1$), ($B_2$) and ($C_1$) in which a molar ratio of ($C_1$) to ($A_1$) is from 0.2 to 1.0, a molar ratio of [($B_1$)+($B_2$)] to ($C_1$) is from 0.9 to 1.1, and a molar ratio of ($B_2$) to ($B_1$) is larger than 0 and no larger than 1.

The liquid crystalline polyester used in the present invention may be a mixture of two or more liquid crystalline polyesters which comprise different combinations of the repeating units selected from the above groups (A), (B) and (C), or a mixture of two or more liquid crystalline polyesters which comprise the same combination of the repeating units but have different flow-starting temperatures.

Herein, a flow-starting temperature means a temperature at which a melt viscosity of a polymer melt is 4,800 Pa·s, which is measured by discharging a melt of a polymer while heating it at a heating rate of 4° C./min. from a capillary rheometer having a nozzle with an inner diameter of 1 mm and a length of 10 mm under a load of 100 kg/cm².

Preferably, the liquid crystalline polyester used in the present invention has a flow-starting temperature in a range between 320° C. and 400° C. When the flow-starting temperature is too low, the liquid crystalline polyester tends to have insufficient mechanical properties and/or heat resistance. When the flow-starting temperature is too high, the processing of the liquid crystalline polyester may be difficult due to the thermal decomposition of the liquid crystalline polyester. More preferably, the flow-starting temperature is 380° C. or less.

The liquid crystalline polyester used in the present invention may be prepared by any conventional method for preparing a liquid crystalline polyester. For example, at least one compound selected from the group consisting of the aromatic hydroxycarboxylic acids and the aromatic diols is acylated with an excessive amount of an aliphatic carboxylic anhydride to obtain an acylated compound, and then the acylated compound is melt-polymerized with at least one carboxylic acid selected from the group consisting of the aromatic hydroxycarboxylic acids and the aromatic dicarboxylic acids by transesterification (polycondensation). As the acylated compound, a previously acylated aliphatic carboxylate ester may be used.

The acylation and/or the transesterification may be carried out in the presence of a catalyst. The catalyst may be a conventional catalyst used as a polymerization catalyst for polyester. Specific examples of the catalyst include metal salt catalysts (e.g. magnesium acetate, stannous acetate, tetrabutyl titanate, lead acetate, sodium acetate, potassium acetate, antimony trioxide, etc.), organic compound catalysts (e.g. N,N-dimethylaminopyridine, N-methylimidazole, etc.), and so on. The catalyst may be added to a reactor when the monomers are charged in the reactor. The catalyst used in the acylation may not necessarily be removed, and the reaction mixture obtained by the acylation may be subjected to the transesterification.

The polycondensation through transesterification may be carried out by melt-polymerization, which may be followed by solid phase polymerization. When the solid phase polymerization is conducted, the polymer from the melt-polymerization is preferably milled to obtain the powder-form or flake-form polymer and then it is subjected to the conventional solid phase polymerization Next, the aluminum borate whisker and the titanium oxide whisker are explained.

The resin composition according to the present invention contains at least one whisker selected from the group consisting of aluminum borate whiskers and titanium oxide whiskers. Among them, the aluminum borate whisker is preferably used.

The whisker is used usually in an amount of 50 to 150 parts by weight, preferably 50 to 130 parts by weight, more preferably 50 to 100 parts by weight, per 100 parts by weight of the liquid crystalline polyester. When the amount of the whisker is too low, the strength of a molded article made of the liquid crystalline polyester resin composition tends to decrease. When the amount of the whisker is too high, the liquid crystalline polyester resin composition has a very high melt viscosity and thus the handling property of the composition tends to deteriorate.

An average length of the whisker used in the present invention may be from 1 to 300 µm, preferably from 5 to 300 µm. When the average length of the whisker is too short, the mechanical strength of the liquid crystalline polyester resin composition may not be sufficiently increased. When the average length of the whisker is too long, the resin composition tends to have insufficient flowability.

An average diameter of the whisker used in the present invention may be from 0.3 to 15 µm, preferably from 0.5 to 15 µm. When the average diameter of the whisker is too small, the mechanical strength of the liquid crystalline polyester resin composition may not be sufficiently increased. When the average diameter of the whisker is too large, the resin composition tends to have insufficient flowability.

Hereinafter, carbon black used in the present invention will be explained.

According to the present invention, carbon black is used usually in an amount of 1 to 30 parts by weight, preferably 3 to 20 parts by weight, per 100 parts by weight of the liquid crystalline polyester. When the amount of carbon black is too low, the effect to prevent the charging of a molded article made of the liquid crystalline polyester resin composition tends to decrease. When the amount of carbon black is too high, the strength of the liquid crystalline polyester resin composition tends to decrease.

The specific surface area of carbon black used in the present invention is at least 200 m²/g, preferably 200 to 3000 m²/g, more preferably 500 to 1500 m²/g. When the specific surface area of carbon black is too small, the effect to prevent the charging of a molded article made of the liquid crystalline polyester resin composition tends to decrease.

Herein, the specific surface area of carbon black is measured by the BET method.

Besides the above whiskers and carbon black, the liquid crystalline polyester resin composition of the present invention may contain plate-form or powdery non-conductive fillers (e.g. glass, mica, talc, clay, calcium carbonate, barium carbonate, dolomite, barium sulfate, titanium oxide, silica, etc.), conductive fillers (e.g. carbon fibers, aluminum fibers, etc.), and so on. These fillers may be used independently or in admixture of two or more of them.

The liquid crystalline polyester resin composition of the present invention may contain thermoplastic resins (e.g. polyamide, polyester, polyphenylene sulfide, polyether ketone, polycarbonate, polyphenylene ether and its modified products, polysulfone, polyethersulfone, polyetherimide, etc.), and thermosetting resins (e.g. phenol resins, epoxy resins, polyimide resins, etc.), as long as the effects of the present invention are not impaired. These resins may be used independently or in admixture of two or more of them.

Furthermore, the liquid crystalline polyester resin composition of the present invention may contain one or more conventional additives such as mold release agents (e.g. fluororesins, metal soaps, etc.), colorants (e.g. dyes, pigments, etc.), antioxidants, heat stabilizers, UV absorbers, antistatic agents, surfactants, etc., as long as the effects of the present invention are not impaired. In addition, the liquid crystalline polyester resin composition of the present invention may contain one or more material having external lubrication effects such as higher fatty acids, higher fatty acid esters, metal salts of higher fatty acids, fluorocarbon base surfactants, etc.

A method for preparing the liquid crystalline polyester resin composition of the present invention is not particularly limited. For example, the resin composition of the present invention can be prepared by separately supplying the liquid crystalline polyester, the whisker, carbon black and other optional components such as the additives, the optional resins, etc. to a melt mixer, by premixing these components by means of a mortar, a Henschel mixer, a ball mill, a ribbon blender, etc. and then supplying the mixture to a melt mixer, and the like.

The liquid crystalline polyester resin composition of the present invention has excellent mechanical properties and can provide insulating molded articles which are hardly charged. Therefore, the molded articles made of the resin composition of the present invention can preferably be used as flexible disc drive components, hard disc components, CD drive components, DVD drive components, containers for conveying and washing electric or electronic components, and so on. In addition, they may be used in applications which require antistatic properties.

EXAMPLES

The present invention will be explained further in detail by the following Examples, which do not limit the scope of the present invention in any way.

In the Examples, properties are measured as follows:
(1) Volume Resistivity
Using a test piece of 64 mm×64 mm×1 mm thickness, a volume resistivity is measured with Multimeter 3557A (manufactured by Hewlett-Packard Co.)
(2) Tensile Strength
Using an ASTM No. 4 dumbbell specimen, a tensile strength is measured according to ASTM D638.

Reference Example 1

Into a reactor equipped with a stirrer, a torque meter, a nitrogen gas inlet tube, a thermometer and a reflux condenser, p-hydroxybenzoic acid (994.5 g, 7.2 moles), 4,4'-dihydroxybiphenyl (446.9 g, 2.4 moles), terephthalic acid (299.0 g, 1.8 moles), isophthalic acid (99.7 g, 0.6 mole) and acetic anhydride (1347.6 g, 13.2 moles) were charged. After purging the interior of the reactor with nitrogen gas, the reaction mixture in the reactor was heated up to 150° C. over 30 minutes under the nitrogen gas stream, and then refluxed for 3 hours while maintaining the temperature at 150° C. Thereafter, the reaction mixture was heated up to 320° C. over 2 hours and 50 minutes while evaporating off by-produced acetic acid and unreacted acetic anhydride. When the increase of a torque was recorded, the reaction was regarded as being completed, and the content was removed from the reactor. The solid obtained was cooled to room temperature and coarsely milled, and the milled solid was heated up to 250° C. over 1 hour and from 250° C. to 280° C. over 5 hours, maintained at 280° C. for 3 hours to proceed solid polymerization. Thereby, a liquid crystalline polyester having a flow-starting temperature of 327° C. was obtained. This liquid crystalline polyester power was placed on a heating stage and heated at a heating rate of 10° C./min. while pressing the polyester with a spring. Optical anisotropy was visually observed at 340° C.

Reference Example 2

Into a reactor equipped with a stirrer, a torque meter, a nitrogen gas inlet tube, a thermometer and a reflux condenser, p-hydroxybenzoic acid (994.5 g, 7.2 moles), 4,4'-dihydroxybiphenyl (446.9 g, 2.4 moles), terephthalic acid (299.0 g, 1.8 moles), isophthalic acid (99.7 g, 0.6 mole) and acetic anhydride (1347.6 g, 13.2 moles) were charged. After purging the interior of the reactor with nitrogen gas, the reaction mixture in the reactor was heated up to 150° C. over 30 minutes under the nitrogen gas stream, and then refluxed for 3 hours while maintaining the temperature at 150° C. After that, 1-methylimidazole (2.4 g) was added and then the reaction mixture was heated up to 320° C. over 2 hours and 50 minutes while evaporating off by-produced acetic acid and unreacted acetic anhydride. When the increase of a torque was recorded, the reaction was regarded as being completed, and the content was removed from the reactor. The solid obtained was cooled to room temperature and coarsely milled, and the milled solid was heated up to 250° C. over 1 hour and from 250° C. to 285° C. over 5 hours, maintained at 285° C. for 3 hours to proceed solid polymerization. Thereby, a liquid crystalline polyester having a flow-starting temperature of 330° C. was obtained. This liquid crystalline polyester power was placed on a heating stage and heated at a heating rate of 10° C./min. while pressing the polyester with a spring. Optical anisotropy was visually observed at 344° C.

Examples and Comparative Examples

The liquid crystalline polyester prepared in each Reference Example was mixed with the components shown in Table 1 in the amounts (parts by weight) shown in Table 1 using a Henschel mixer, and then pelletized with a twin-screw extruder (PCM 30 manufactured by IKEGAI) at a cylinder temperature of 340° C. to obtain a liquid crystalline polyester resin composition. After drying this resin composition at 120° C. for 12 hours, it was molded in the form of a test piece of 64 mm×64 mm×1 mm thickness and an ASTM No. 4 dumbbell specimen with an injection molding machine (PS40E5ASE manufactured by NISSEI RESIN INDUSTRIES Co., Ltd.) at a cylinder temperature of 370° C. These test pieces were subjected to the measurements described above. The results are summarized in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Liquid crystalline polyester (pbw) (Ref. Ex. 1) | 100 | — | 100 | 100 | 100 | 100 | 100 | 100 |
| Liquid crystalline polyester (pbw) (Ref. Ex. 2) | — | 100 | — | — | — | — | — | — |
| Aluminum borate whisker (pbw) | 71 | 71 | 71 | 71 | 71 | 71 | 71 | — |
| Carbon black 1 (pbw) | 9 | 9 | 16 | — | — | — | — | 9 |
| Carbon black 2 (pbw) | — | — | — | 4 | — | — | — | — |
| Carbon black 3 (pbw) | — | — | — | — | 11 | 25 | — | — |
| Specific surface area of carbon black ($m^2/g$) | 800 | 800 | 800 | 1270 | 61 | 61 | — | 800 |
| Volume resistivity (ohm · m) | $1 \times 10^5$ | $1 \times 10^5$ | $1 \times 10^5$ | $1 \times 10^6$ | $1 \times 10^{13}$ | $1 \times 10^6$ | $1 \times 10^{16}$ | $1 \times 10^1$ |
| Tensile strength (MPa) | 141 | 135 | 116 | 138 | 130 | 100 | 145 | 140 |

Note:
Aluminum borate whisker: ALBOREX Y (manufactured by Shikoku Corporation)
Carbon black 1: KETCHEN EC (manufactured by Lion Corporation)
Carbon black 2: KETCHEN EC-600DJ (manufactured by Lion Corporation)
Carbon black 3: DENKA BLACK (manufactured by DENKI KAGAKU KOGYO KABUSHIKI KAISHA)

What is claimed is:

1. A liquid crystalline polyester resin composition comprising:

100 parts by weight of a liquid crystalline polyester;

50 to 150 parts by weight of at least one whisker selected from aluminum borate whisker and titanium oxide whisker; and 3 to 20 parts by weight of carbon black having a specific surface area of at least 200 $m^2/g$, wherein the liquid crystalline polyester resin composition has a volume resistivity of $10^4$ to $10^7$ Ω·m.

2. The liquid crystalline polyester resin composition according to claim 1, which contains 50 to 130 parts by weight of said at least one whisker and 3 to 20 parts by weight of said carbon black per 100 parts by weight of said liquid crystalline polyester.

3. The liquid crystalline polyester resin composition according to claim 1, wherein said at least one whisker has an average length of 1 to 300 μm and an average diameter of 0.3 to 15 μm.

4. The liquid crystalline polyester resin composition according to claim 1, wherein said carbon black has a specific surface area of 200 to 3000 $m^2/g$.

5. The liquid crystalline polyester resin composition according to claim 1, wherein said liquid crystalline polyester has a flow-starting temperature of 320 to 400° C.

6. The liquid crystalline polyester resin composition according to claim 1, wherein said liquid crystalline polyester comprises repeating units (A1) derived from p-hydroxybenzoic acid, repeating units (B1) derived from terephthalic acid, repeating units (B2) derived from isophthalic acid, and repeating units (C1) derived from 4,4'-dihydroxybiphenyl.

* * * * *